Dec. 1, 1964 D. B. JAMES ETAL 3,159,811

PARITY SYNCHRONIZATION OF PULSE CODE SYSTEMS

Filed June 29, 1961

INVENTORS D. B. JAMES
W. T. WINTRINGHAM

BY Harry C. Hart
ATTORNEY

United States Patent Office 3,159,811
Patented Dec. 1, 1964

3,159,811

PARITY SYNCHRONIZATION OF PULSE CODE SYSTEMS

Dennis B. James, Bernardsville, and William T. Wintringham, Chatham, N.J., assignors to Bell Telephone Laboratories, Incorporated, New York, N.Y., a corporation of New York Filed June 29, 1961, Ser. No. 120,718
16 Claims. (Cl. 340—146.1)

Figures 1, 2:
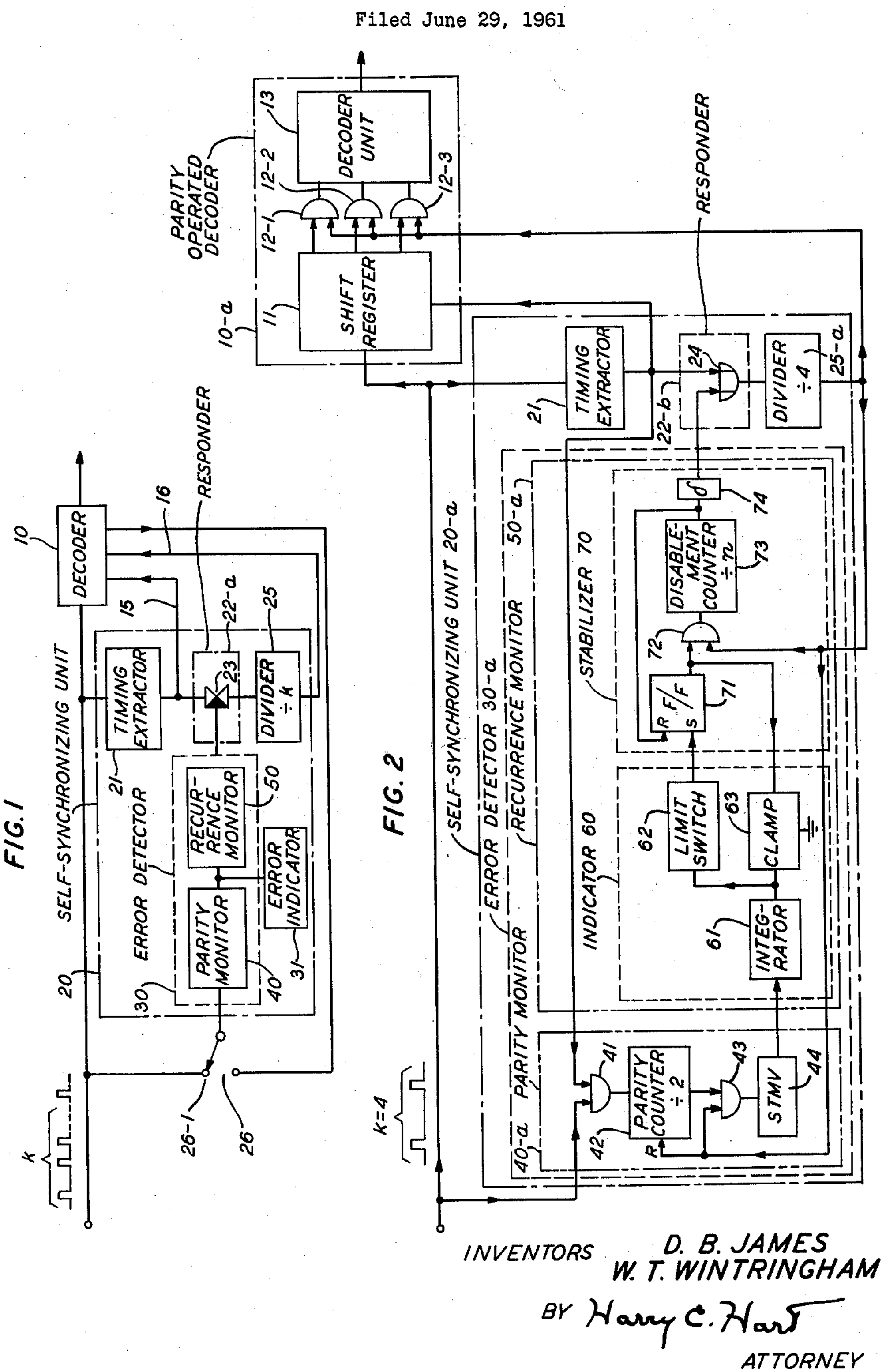

This invention relates to the decoding of encoded message waves and, more particularly, to the identification of message wave code words that are accompanied by parity check signals.

A word is the smallest portion of a message wave with informational significance. In code form, a word is an assemblage of characters represented, for example, by a train of discrete signals that are spaced from each other on a time scale. Such code signals are derivable at a transmitter by taking samples of a preassigned parameter from a word length of a wave in analog form, or, by designating the samples as words and translating them into subordinate constituents. Typically, the elements of a code word are dual-valued and have a distinctive permutation. Then each position or "notch" of the word is occupied by a binary digit called a bit, which admits of only two recognizably different conditions variously designated as dot and dash, mark and space, or, more generally, *a* and *b*.

During transmission, the various constituents of a code word may become modified because of spontaneous disturbances. A code signal originating as a mark may be detected as a space. Evidently code words containing transmission and decoding errors should be identified at a receiver. Hence, it is desirable to accompany transmitted code words by parity signals that permit the detection and location of code signal errors. As described by R. W. Hamming and B. D. Holbrook in Patent 2,552,629, issued May 15, 1951, the number of parity bits employed per word depends upon the extent to which the error detection is to be implemented. One bit per word suffices to determine whether or not the word contains a single error, but a second bit is required to locate the position of the error. As the number of parity bits per word increases, the flexibility of a parity check system likewise increases. Some of the numerous implementations of the parity principle in the construction of transmitter and receiver apparatus are presented in Patent 2,596,199 issued to W. R. Bennett.

Effective employment of parity bits is contingent upon the proper grouping of code signals. While the grouping can be accomplished by separating the successive code words from each other, this is undesirable where spaces represent code elements, as in the mark-space binary code. Furthermore, the use of spaces for word separation reduces the capacity of a communications channel interconnecting transmitter and receiver stations. Equally objectionable, from the standpoint of reduced channel capacity, is the use of redundant code elements. Although these difficulties have been surmounted to a limited extent by increasing either the amplitudes or the widths of the parity signals and using them to perform a framing function, modifications in the parity signals make for substantial complexity in coding, transmission and decoding.

Accordingly, it is an object of the invention to accomplish the identification of code words without the need for either redundant code elements or modifications in parity signals employed in detecting occasional system errors. A related object is to realize the self-synchronization of parity-controlled decoder systems.

While the content of an encoded message wave is unknown beforehand, certain of its characteristics are readily available, such as the number and disposition of accompanying parity bits. The latter must be known before decoding can occur. It is a yet further object of the invention to make use of the characteristics of code groups including parity bits in accomplishing the self-synchronization of parity-controlled decoder systems.

The invention accomplishes the above and related objects by monitoring, during decoding, the parity statistics of code signals being grouped at a decoder. A lack of synchronism is indicated when the parity statistics deviate from a prescribed standard.

As long as the code signals are correctly grouped, a parity monitor will detect only an occasional departure from a parity constraint, but a grouping that repeatedly produces a condition of disparity is indicative of an error in synchronization. In that event the signals are regrouped and re-examined until the parity statistics of the reconstituted code words indicate the absence of a synchronization error. In this way the correct phase relation is established between the code words dispatched from the transmitter and those reconstituted at a receiver. Such a decoder system is said to be self-synchronized, in general, and self-framed, in particular.

While the invention provides for error recognition, it also avoids premature regrouping. An occasional error, attributable to faults in decoding, or in transmission, rather than in the identification of code words, should not command regrouping. Hence, it is a feature of the invention that corrective action does not take place until the frequency of departures from the parity constraint rises above a prescribed threshold.

An advantageous employment of parity synchronization is had when each code word is accompanied by a single parity bit. Then, if the disparity condition is present with a high degree of recurrence, namely for approximately fifty percent of the code groups examined, a regrouping of the code signals is indicated. Such a parity-controlled system is said to be self-framed because it ultimately accomplishes positive identification of the code words being decoded.

Other features of the invention will become apparent after consideration of an illustrative embodiment taken in conjunction with the drawings in which:

FIG. 1 is a general block diagram of a parity self-synchronizing decoder system; and FIG. 2 is a block diagram of a self-synchronizing decoder system adapted to operate with a single parity signal per code word.

Turn now to the parity-controlled, self-synchronizing decoder system of FIG. 1, to which an incoming train of code signals is applied. Each sequential group of code and parity signals occupying *k* code or notch positions is applied to a decoder 10, whose nature depends upon the kind of encoding to which the original message wave was subjected. Ordinarily, such a decoder 10 would be accompanied by a synchronizing unit to direct, through the use of synchronizing signals, the translation of each code word, included in a code group, into its analog counterpart at intervals that are phased with respect to the code word source. Since code signals processed according to the invention do not contain separate synchronizing signals, the decoder of FIG. 1 is instead accompanied by a self-synchronizing or self-phasing unit 20.

With self-synchronization, a timing extractor 21, advantageously a conventional crystal-tuned amplifier, is used to derive marker signals that identify each position or notch of the various code groups. These marker signals pass through a responder 22–*a* into a divider 25. They also pass over path 15 to a first timing control point of the decoder 10.

For each *k*th marker signal, there is applied to the decoder 10 over path 16 a control signal indicating that the preceding group of $k$ code signals contains a code word to be translated into analog form. Evidently the analog output of the decoder 10 will be in error if the sode signals are misgrouped.

An error condition is established by processing, in a detector 30, message constituents derived from the decoder 10 or from the incoming code signals, depending upon the setting of a first selector switch 26. As shown in FIG. 1, the selector switch is set in its first position 26–1 to provide the self-synchronizing unit 20 with signals obtained at the input of the decoder 10. In any event, a parity monitor 40 of the detector 30 responds to the occurrence of a parity error. Besides supplying an indicator signal to a recurrence monitor 50, the parity monitor 40 also supplies a control signal to the error indicator 31 in order that code words containing occasional errors may be identified. Repeated detection of an error condition by the recurrence monitor 50 causes the responder **22–*a* to alter the position marker signals applied to the divider 25**.

One form of responder **22–*a* employs a switch 23, whose normally closed contacts are forced apart to interrupt the marker-signals. For each interruption at the responder 22–*a*, enduring beyond the interval between timing signals, the divider control signal is delayed by at least one code position, i.e., is caused to slip at least one notch, and thus modify the groupings of the code elements that constitute the apparent code words, and hence the decoder output. As long as the decoder 10 remains out of synchronism, i.e., out of phase with the source of its code groups, parity check failures occur, with a high degree of recurrence, and the error detector 30 successively operates the responder 22–*a* and causes the divider 25** to slip one notch for each activation.

To illustrate parity self-synchronization, when a single parity bit is used with each code word, the system of FIG. 1 is adapted as the self-framing system of FIG. 2 for three-bit pulse code modulation.

One way of forming an appropriate parity code group is by supplementing each conventional code word with a parity bit in such a way that the number of pulse signals in the entire group meets a specified constraint.

Code groups using conventional binary digits and incorporating this principle are indicated in Table I, where the sum of the constituent bits in the word is a "zero" for its digit of lowest denomination; i.e., the total number of "ones" is even. Alternatively, the parity bits could have been selected to make the total number of "ones" odd.

*Table I*

| Word Level | Code Word | Parity Bit |
|---|---|---|
| 7 | 111 | 1 |
| 6 | 110 | 0 |
| 5 | 101 | 0 |
| 4 | 100 | 1 |
| 3 | 011 | 0 |
| 2 | 010 | 1 |
| 1 | 001 | 1 |
| 0 | 000 | 0 |

In Table I, the word levels are integral, but it is to be understood that the invention applies equally with other kinds of parity coding.

In the parity operated decoder **10–*a* of FIG. 2 incoming binary digits (bits) enter a four-stage shift register 11, whose shifting signals are supplied by the timing extractor 21 of a self-framing unit 20–*a*. For every fourth-bit position, nominally occupied by a parity signal, the register AND gates 12–1 through 12–3 are operated by a control signal from a divider 25–*a*, allowing each code word of three bits to enter a decoder unit 13**, which may be of conventional design.

Simultaneously, the code signals are applied to the error detector **30–*a* of a self-framing unit 20–*a*. The detector combines a parity monitor 40–*a* with a recurrence monitor 50–*a***.

In the parity monitor **40–*a*, an AND gate 41 activated by the timing extractor 21 shapes the incoming pulse signals that enter a parity counter 42. The counter 42 is of the divide-by-two variety that is reset by a signal from the divider 25–*a* at the end of each group interval. If, during that interval, the number of pulses entering the counter 42 is odd, a level appears at the output of the counter 42 with the result that the divider signal energizes a parity AND gate 43, which, in turn, activates a single trip multivibrator 44. The multivibrator 44 serves to lengthen the output pulse signals derived from the counter 42**.

At the recurrence sensor **50–*a*, incorporating an indicator 60 and a stabilizer 70, an integrator 61 accumulates outputs from the parity monitor 40–*a* until the threshold of a limit switch 62 is exceeded causing the activation of a stabilizer flip-flop 71**. The limit switch is desirably an amplifier with a prescribed cut-off bias level.

The stabilizer 70 operates in conjunction with the clamping circuit 63 of the integrator 61 to regulate the timing of stabilized pulse signals applied to the responder **22–*b*, which in FIG. 2 takes the form of an OR gate 24, instead of the switch 23 of FIG. 1, to supplement the timing signals rather than inhibit them. Each outgoing pulse signal supplied by the stabilizer 70, after being delayed in a delay unit 74, is inserted between the usual marker signals produced by the extractor 21, allowing the divider 25–*a*** to operate one position, or notch, early and thus regroup the incoming code signals.

Once the stabilizer flip-flop 71 has been activated, further operation of the integrator is undesirable until the self-framing unit **20–*a* has been stabilized. Thus, the clamp 63 is operated for a duration that brings the output of the integrator 61 to ground level. This period is determined by the disablement counter 73 which resets the flip-flop 71 and removes the clamping action. The disablement counter 73 is stepped by control signals from the divider 25–*a* as long as an output level is available at a disablement AND gate 72. When the impedance of the clamp is appreciable, the counter is desirably set to disable the indicator for the time interval occupied by $n$ code groups, where $n$ is determined by the clamp time constant, after which a pulse is inserted at the responder 22–*b***.

To further demonstrate the self-synchronizing or self-framing principle, assume that the code words applied to the parity-operated decoder **10–*a*** of FIG. 2 have been consecutively derived from an analog wave with a maximum amplitude of nine units. Assume further that the analog wave has been sampled at the rate prescribed by the sampling theorem and that each of the samples is a word to be encoded in conjunction with a single parity signal. For gererality, the successive sample amplitudes are taken from a table of random numbers and are indicated in the first column of Table II. When translated according to Table I, the amplitude levels become successive four-digit code words given in the second column of Table II.

*Table II*

| Sample Amplitude | Code Group | First Error Code Group | Second Error Code Group |
|---|---|---|---|
| 7 | 1111 | 1111 | 1111 |
| 6 | 1100 | 1001 | 0010* |
| 5 | 1010 | 0100* | 1001 |
| 3 | 0110 | 1101* | 1011* |
| 6 | 1100 | 1001 | 0011 |
| 7 | 1111 | 1110* | 1100 |
| 1 | 0011 | 0110 | 1101* |
| | 0110 | 1101* | 1010 |
| 5 | 1010 | | |

Upon being misgrouped by one code position by having the signals in the last three notch positions of each preceding code group combined with any signal occupying the first notch position of the succeeding code group, the code signals derived from the samples produce the error code groups, containing apparent code words, shown in the third column of Table II. Of the groups in the third column four out of eight, those marked with an asterisk, contain parity errors. If the code words are misgrouped by two positions, the resultant permutations of their bits are as indicated in the final column of Table II and contain three out of eight groups with parity errors. Of course, the example has considered but a few code groups. On the average, for large numbers of groups, there will be parity errors fifty percent of the time.

In practice, significant divergences between the recurrence rates of occasional error signals and those attributable to the misgrouping of code words have been obtained for various message waves. A typical example is provided by a video wave that was sampled at a rate of approximately one-fifth megacycle and encoded into seven binary digits with an eighth digit added for parity check purposes.

For occasional errors in the decoding of the video wave with correctly grouped code signals, no more than one hundred pulse signals per second are typically detected at the recurrence integrator 61. However, for code signals misgrouped by one position, the pulse rate at the integrator 61 increases to approximately one hundred thousand per second. A comparable increase applies for all other misgroupings. When the integrator was set to respond in 800 microseconds and the disablement time was 80 microseconds, making the divisor *n* of the counter 73 in FIG. 2 equal sixteen, the maximum time required to self-frame the decoder system was found to be about 0.006 of a second for seven successive regroupings.

Similar results have been obtained with seven-bit differentially encoded waves having an additional parity bit.

Although the code signals considered in the various embodiments have been derived from a single source, the self-framing principle of the invention can be applied to multiplexed signals as well. In that case self-framing on a common channel is required with respect to only one of the multiplexed code messages.

Additionally, related adaptations of the invention, including numerous kinds of error detectors, special codes, digital and analog processings of encoded signals to activate the detector, will occur to those skilled in the art. Also apparent will be numerous parity and recurrence monitors which facilitate the positive identification of code words that are transmitted with parity signals but without separate framing signals. Furthermore, while the invention has been described in terms of discrete code elements, it is to be appreciated that coding applies to any translation of information to prescribed patterns and the invention may be turned to account in parity decoding generally.

What is claimed is:

1. In apparatus for reconstituting a message from incoming groups of two-valued pulses developed at a transmitter station, each group being composed of (*a*) a code word representing a parameter of said message and (*b*) at least one parity check pulse of a value such that the number of pulses in the entire group normally meets a specified constraint, whereby each occasional departure from said constraint is indicative of a corresponding occasional error, said apparatus requiring, for correct message reconstitution, a particular phase relation between its operations and operations conducted at the transmitter station, said apparatus including means for monitoring incoming pulse groups, means for deriving from said monitoring means an indication of each departure from said constraint, and means for recovering said particular phase relation, when once lost, which comprises means for also determining, from said monitoring operation, the frequency of incidence of said departures and, means, operative upon an abnormal incidence frequency of said departures, for altering the existing phase of said receiver operations.

2. Apparatus for identifying the constituent code groups formed from a message wave translated into a train of code signals subject to a parity constraint imposed by supplementing each code word of the message wave with at least one parity signal, which apparatus comprises means for grouping the received signals into code groups, means for detecting departures of said code groups from the parity constraint, whereby a substantial recurrence rate of said departures indicates an erroneous grouping of said received signals, means for monitoring said recurrence rate, and means activated by said monitoring means for regrouping said received signals until said recurrence rate is reduced.

3. Apparatus for synchronizing a decoder with respect to an encoder generating an ensemble of code signal characters including at least one parity check character for each constituent code word in an encoded message wave, which comprises means for grouping the code characters into successive ensembles of characters constituting code groups, means for checking the parity of each of said code groups, means for distinguishing between occasional and frequent incidences of disparity, means responsive to said frequent incidences of disparity for deriving a control signal, and means for regrouping said code characters into said ensembles with a shift of at least one character for each occurrence of said control signal, whereby said code groups are successively reconstituted until said frequent incidences of disparity are substantially reduced.

4. In apparatus for decoding the same code signals at a decoder as are generated per frame with a known parity constraint at an encoder, self-framing means comprising means responsive to the code signals for indicating the successive time-scale positions thereof, means controlled by said indicating means for grouping said incoming code signals according to the number of time-scale positions occupying a nominal framing interval, means activated by successive ones of said incoming code signals for sensing the occurrence of departures from said known parity constraint, means activated by said occurrence sensing means for sensing the recurrence rate of said departures and for developing a control signal when said recurrence rate exceeds a prescribed threshold, indicating that said decoding means is out of frame, and means activated by said control signal for recurrently modifying the groupings of said code signals within said framing interval, whereby said code signals are correctly framed when said recurrence rate falls below said prescribed threshold.

5. Apparatus as defined in claim 4 wherein said occurrence-sensing means comprises a parity counter.

6. Apparatus as defined in claim 4 wherein said recurrence-sensing means comprises an integrator and a limit switch in tandem connection.

7. Apparatus as defined in claim 4 wherein said modifying means comprises means for bypassing at least one of the indicated time-scale positions of said code signals.

8. Apparatus as defined in claim 6 wherein said bypassing means comprises a normally closed switch whose contacts are opened by said exceeded threshold condition.

9. Apparatus as defined in claim 4 wherein said modifying means comprises means for inserting at least one control pulse signal between two successive time-scale positions of said code signals.

10. Apparatus as defined in claim 8 wherein said inserting means comprises an OR gate activated jointly by said indicating means and by said recurrence-sensing means.

11. Apparatus as defined in claim 4 further including means for disabling said recurrence-sensing means for a prescribed time interval.

12. Apparatus as defined in claim 10 wherein said disabling means comprises a flip-flop and a disablement counter in tandem connection.

13. In apparatus for reconstituting a message from incoming groups of two-valued pulses developed at a transmitter station, each group being composed of (*a*) a code word representing a parameter of said message and (*b*) at least one parity check pulse of a value such that the number of pulses in the entire group normally meets a specified constraint, whereby each occasional departure from said constraint is indicative of a corresponding occasional error, said apparatus requiring, for correct message reconstitution, a particular phase relation between its operations and operations conducted at the transmitter station, said apparatus including an input point to which the incoming pulse groups are applied, a receiver connected to said input point, means connected to said input point for deriving an indication of each departure from said constraint, and means connected to said deriving means for recovering said particular phase relation, when once lost; which comprises means connected to said deriving means for determining the frequency of incidence of said departures and means, interconnecting said determining means with said receiver and operative upon an abnormal incidence frequency of said departures, for altering the existing phase of said receiver operations until said particular phase relation is recovered.

14. Apparatus for identifying the constituent code groups formed from a message wave translated into a train of code signals subject to a parity constraint imposed by supplementing each code word of the message wave with at least one parity signal, which apparatus comprises an input point to which the code signals are applied, means connected to said input point for grouping said code signals into code groups, means connected to said grouping means for detecting departures of said code groups from the parity constraint, whereby a substantial recurrence rate of said departures indicates an erroneous grouping of said received signals, means connected to said detecting means for monitoring said recurrence rate, and means interconnecting said monitoring means with said grouping means for regrouping said received signals until said recurrence rate is reduced.

15. Apparatus for synchronizing a decoder with respect to an encoder generating an ensemble of code signal characters including at least one parity check character for each constituent code word in an encoded message wave, which comprises an input point to which the code characters are applied, means connected to said input point for grouping said code characters into successive ensembles of characters constituting code groups, means connected to said grouping means for checking the parity of each of said code groups, means connected to said checking means for distinguishing between occasional and frequent incidences of disparity, means connected to said distinguishing means and responsive to said frequent incidences of disparity for deriving a control signal, and means interconnecting said deriving means with said grouping means for regrouping said code characters into said ensembles with a shift of at least one character for each occurrence of said control signal, whereby said code groups are successively reconstituted until said frequent incidences of disparity are substantially reduced.

16. In apparatus for decoding the same code signals at a decoder as are generated per frame with a known parity constraint at an encoder, self-framing means comprising means for indicating the successive time-scale positions of incoming code signals, means connected to said indicating means for grouping said incoming code signals according to the number of time-scale positions occupying a nominal framing interval, means connected to said grouping means and activated by successive ones of said incoming code signals for sensing the occurrence of departures from said known parity constraint, means connected to said occurrence sensing means for sensing the recurrence rate of said departures and for developing a control signal when said recurrence rate exceeds a prescribed threshold, indicating that said decoding means is out of frame, and means interconnecting said recurrence sensing means with said grouping means and activated by said control signal for recurrently modifying the groupings of said code signals within said framing interval, whereby said code signals are correctly framed when said recurrence rate falls below said prescribed threshold.

No references cited.